United States Patent [19]
Kitamura et al.

[11] Patent Number: 5,292,836
[45] Date of Patent: Mar. 8, 1994

[54] PREPARATION OF VINYL CHLORIDE POLYMERS USING HIGH-SPEED AND LOW-SPEED SHEAR AGITATION

[75] Inventors: Hajime Kitamura, Ichihara; Ichiro Kaneko, Hazaki, both of Japan

[73] Assignee: Shin-Etsu Chemical Co., Ltd., Tokyo, Japan

[21] Appl. No.: 952,472

[22] Filed: Sep. 28, 1992

Related U.S. Application Data

[63] Continuation-in-part of Ser. No. 680,353, Apr. 4, 1991, abandoned.

[30] Foreign Application Priority Data

Apr. 5, 1990 [JP] Japan ................... 2-90683

[51] Int. Cl.$^5$ .............................................. C08F 2/18
[52] U.S. Cl. .......................................... 526/88; 526/62; 526/74
[58] Field of Search .............................. 526/88, 62, 74

[56] References Cited

U.S. PATENT DOCUMENTS

| | | | |
|---|---|---|---|
| 3,682,877 | 8/1972 | Czekay | 526/202 |
| 3,813,373 | 5/1974 | Ito | 526/88 |
| 4,323,664 | 4/1982 | Mukoyama et al. | |
| 4,458,057 | 7/1984 | Basu. | |
| 4,732,954 | 3/1988 | Carroll, Jr. et al. | 526/88 |
| 4,933,399 | 6/1990 | Shimizu | 526/62 |
| 4,940,759 | 7/1990 | Yang | 526/62 |

FOREIGN PATENT DOCUMENTS 8102158  8/1981  PCT Int'l Appl. .

*Primary Examiner*—Christopher Henderson
*Attorney, Agent, or Firm*—Oblon, Spivak, McClelland, Maier & Neustadt

[57] ABSTRACT

A process for preparation of a vinyl chloride polymer comprising the steps of subjecting an aqueous medium containing vinyl chloride monomer or a mixture of vinyl chloride monomer with other vinyl monomer, a polymerization initiator and a dispersant to high-speed shear agitation at a shear rate of $10^4$ sec$^{-1}$ or above to prepare a suspended dispersion containing fine particles of the monomer(s) dispersed therein, then subjecting the suspended dispersion to low-speed shear agitation at a shear rate of from 10 to 100 sec$^{-1}$, and thereafter starting suspension polymerization. Even with a decreased amount of dispersant, the process inhibits the coarsening of the polymer particles, to yield the polymer with a narrow particle diameter distribution. Deposition of scale and formation of fish-eyes are also prevented effectively.

5 Claims, No Drawings

PREPARATION OF VINYL CHLORIDE POLYMERS USING HIGH-SPEED AND LOW-SPEED SHEAR AGITATION

This application is a continuation-in-part of application Ser. No. 07/680,353, filed on Apr. 4, 1991, now abandoned.

BACKGROUND OF THE INVENTION

1. Field of the Invention

This invention relates to a process for preparation of vinyl chloride polymers such as polyvinyl chloride, and more particularly to a process for preparation of a vinyl chloride polymer having a narrow distribution of particle size and capable of being processed into products having few fish-eyes.

2. Description of the Prior Arts

A process for preparation of vinyl chloride polymers by dispersing vinyl chloride or a vinyl monomer mixture comprised mainly of vinyl chloride in an aqueous medium by use of a suitable dispersant and subjecting the resultant dispersion to suspension polymerization by use of an oil-soluble catalyst is disclosed, for instance, in "Polyvinyl Chloride-Its Chemistry and Industry-III", edited by Kinki Chemical Industry Association, Vinyl Section, and published from Asakura Publishing Co., Ltd. on Jan. 20, 1969. The process is now widely practiced on an industrial scale.

Also, Japanese Patent Publication (KOKOKU) No. 63-56245 (1988) discloses a process for preparation of a vinyl chloride polymer in which high-speed shear agitation is applied to a polymerization reaction system, followed by suspension polymerization.

In the above processes for preparation of vinyl chloride polymers, however, the use of not less than 0.5% by weight of dispersant based on the monomer is indispensable. If the amount of the dispersant is decreased, the resultant vinyl chloride polymer particles will be coarser and have a broader distribution of particle diameter. Furthermore, the so-called polymer scale will be deposited on the walls of the polymerization vessel, and the deposited scale may peel off to mix into the reaction product, causing fish-eyes and a lowered product quality.

In addition, the process for preparation of a vinyl chloride polymer disclosed in Japanese Patent Publication (KOKOKU) No. 63-56245 (1988) is applied to the preparation of vinyl chloride polymers for paste resin use, particularly. That is to say, the process is for preparing vinyl chloride polymers with an extremely small particle diameter of from several micrometers to several tens of micrometers, and is different from the general suspension polymerization process for preparation of vinyl chloride polymers 100 to 200 μm in particle diameter.

SUMMARY OF THE INVENTION

Accordingly, it is an object of this invention to provide a process for preparation of a vinyl chloride polymer by suspension polymerization which permits an effective decrease in the amount of dispersant used and which inhibits effectively the coarsening of the vinyl chloride polymer particles obtained and the lowering in the product quality due to polymer scale.

It is a more specific object of this invention to provide a process for preparation of a vinyl chloride polymer by suspension polymerization which is capable of yielding a vinyl chloride polymer with an average particle diameter of from 120 to 170 μm and an extremely narrow distribution of particle size and capable of being processed into products with few fish-eyes.

The above objects are attained, according to this invention, by subjecting a suspended monomeric dispersion to high-speed shear agitation, then to low-speed shear agitation, and thereafter starting polymerization.

According to this invention, there is provided a process for preparation of a vinyl chloride polymer comprising the steps of subjecting an aqueous medium containing vinyl chloride monomer or a mixture of vinyl chloride monomer with other vinyl monomer, a polymerization initiator and a dispersant to high-speed shear agitation at a shear rate of $10^4 \sec^{-1}$ or above to prepare a suspended dispersion containing fine particles of the monomer or monomers dispersed therein, then subjecting the suspended dispersion to low-speed shear agitation at a shear rate of from 10 to 45 $\sec^{-1}$, and thereafter starting suspension polymerization.

It is possible, according to this invention, to obtain a vinyl chloride polymer with a narrow particle size distribution even where a decreased amount of dispersant is used. It is also possible to inhibit effectively the deposition of polymer scale on inner wall surfaces of the polymerization vessel, to obviate effectively the increase in the number of fish-eyes, and to obtain a vinyl chloride polymer of extremely high quality.

DETAILED DESCRIPTION OF PREFERRED EMBODIMENTS

Monomer

The monomer to be used as a polymerizable starting material in the process of this invention may be either vinyl chloride alone or a mixture of vinyl chloride and other vinyl monomer copolymerizable therewith. Where vinyl chloride and other vinyl monomer are used, it is generally desirable to use the vinyl chloride in an amount of at least 50% by weight based on the monomeric mixture. The vinyl monomers other than vinyl chloride include, for example, vinyl esters such as vinyl acetate, vinyl propionate, etc.; acrylic and methacrylic esters such as methyl (meth)acrylate, ethyl (meth)acrylate, etc.; olefins such as ethylene, propylene, etc.; maleic anhydride; acrylonitrile; styrene; vinylidene chloride, and so on.

Polymerization Initiator

As the polymerization initiator to be used in the process of this invention, those initiators conventionally used for polymerization of vinyl chloride can be used. The initiators usable include, for example, percarbonate compounds such as diisopropyl peroxydicarbonate, di-2-ethylhexyl peroxycarbonate, diethoxyethyl peroxydicarbonate, etc.; perester compounds such as t-butyl peroxypivalate, t-hexyl peroxypivalate, t-butyl peroxyneodecanate, α-cumyl peroxyneodecanate, etc.; peroxides such as acethylcyclohexylsulfonyl peroxide, 2,4,4-trimethylpentyl 2-peroxyphenoxyacetate, 3,5,5-trimethylhexanoyl peroxide, etc.; azo compounds such as azobis-2,4-dimethylvaleronitrile, azobis(4-methoxy-2,4-dimethylvaleronitrile), etc.; and so on. These initiators may be used either singly or in combination of two or more.

Generally, the polymerization initiators are used in an amount of preferably from 0.01 to 0.30 parts by weight, more preferably from 0.04 to 0.20 parts by weight per 100 parts by weight of the monomer(s).

Dispersant

Nonlimitative examples of the dispersant for use in this invention include water-soluble cellulose esters such as methyl cellulose, hydroxyethyl cellulose, hydroxypropyl cellulose, hydroxypropyl methyl cellulose, etc.; water-soluble polymers such as water-soluble partially saponified polyvinyl alcohols, polyacrylic acids, gelatin, and so on. These dispersants may be used either singly or in combination of two or more.

The amount of the dispersant to be used depends on the particle diameter of the polymer desired and the dispersing conditions such as the shearing force for agitation. In this invention, it is generally preferable to use the dispersant in an amount of from 0.01 to 0.09 parts by weight, more preferably from 0.03 to 0.06 parts by weight, per 100 parts by weight of the monomer(s).

Other Additives

To the aforementioned components for polymerization in this invention can be added scale-preventive additives, which are known per se, in order to inhibit the deposition of scale on inner wall surfaces of the polymerization vessel. Such scale-preventive additives include, for example, the nitric acid or nitrites as disclosed in Japanese Patent Publication No. 51-1471 (1976), the oxalic acid or oxalates as disclosed in Japanese Pre-examination Patent Publication (KOKAI) No. 51-126286 (1976), the water-soluble metallic salts as disclosed in Japanese Pre-examination Patent Publication (KOKAI) No. 50-126786 (1975), the hydrazine or hydrazine salts as disclosed in Japanese Pre-examination Patent Publication (KOKAI) No. 50-111187 (1975), the water-soluble dithiocarbamates or xanthogenates as disclosed in Japanese Patent Publication (KOKOKU) No. 60-38407 (1985), the thiocyanates as disclosed in Japanese Patent Publication (KOKOKU) No. 60-6361 (1985), and so on. The scale-preventive additive is added to the reaction mixture preferably before the start of polymerization.

If necessary, furthermore, a polymerization degree controller, chain transfer agent, pH adjustor, antistatic agent, etc. conventionally used suitably for polymerization of vinyl chloride or a monomeric mixture comprised mainly of vinyl chloride may also be added to the polymerization mixture.

These additives, such as scale-preventive additive, can be added in suitable amounts, which are known per se.

High-Speed Shear Agitation

In the process for preparation of a vinyl chloride polymer according to this invention, high-speed shear agitation is carried out after water, the monomer, the polymerization initiator, the dispersant and the optional additives (which are added as required) are placed in a vessel, e.g., a premixing vessel and preliminarily dispersed by mixing and agitation.

The materials may be placed in the vessel in any desired order. It is generally preferable, however, to first place water, the polymerization initiator and the dispersant and then place the monomer, into the vessel.

The high-speed shear agitation is carried out at a shear rate of $10^4 \text{sec}^{-1}$ or above, preferably from $10^4$ to $10^6 \text{sec}^{-1}$. High-speed agitators suitable for carrying out the high-speed shear agitation include, for example, high-speed pumps, colloid mills, high-pressure jet nozzles, high-pressure jet type homogenizers, turbine type homogenizers, etc.

The high-speed shear agitation is carried out for dispersing the monomer and the like into the form of fine droplets having a particle diameter of from 0.1 to 10 $\mu$m, preferably from 0.5 to 5 $\mu$m, and a sufficient duration of the agitation is generally about 0.05 to 5 seconds. Concurrently with the high-speed shear agitation, the dispersion in the premixing vessel may be circulated 5 or 6 times, for example, by a high-speed pump, whereby the particle size distribution of the dispersoid droplets is narrowed.

In this invention it is desirable to carry out the high-speed shear agitation at a temperature ranging from 10° to 30° C. Use of an excessively high temperature will cause polymerization to proceed, thereby spoiling the scheme of performing the high-speed shear agitation before the start of the polymerization.

According to this invention, the high-speed shear agitation causes the dispersant to be adsorbed sufficiently on the surfaces of the finely dispersed particles of the monomer and the like, thereby stabilizing the polymerization system. Consequently, it is possible to use the dispersant in a reduced amount, and to prevent effectively the deposition of scale on inner wall surfaces of the polymerization vessel. Furthermore, the polymerization initiator is dispersed uniformly on the surfaces of the monomer, so that the formation of fish-eyes can be suppressed remarkably.

Low-Speed Shear Agitation

After the aforementioned high-speed shear agitation is finished, the liquid dispersion is normally transferred into a polymerizing vessel, where low-speed shear agitation at a shear rate of from 10 to 100 $\text{sec}^{-1}$ is carried out prior to polymerization. By the low-speed shear agitation, extremely minute ones of the dispersoid droplets disappear, resulting in a remarkably narrow distribution of particle size of the dispersoid droplets. When the liquid dispersion in such a state is subjected to suspension polymerization, polymer particles with a narrow particle size distribution and high quality can be obtained.

In this invention, the low-speed shear agitation is carried out desirably in the temperature range from 10° to 30° C., as in the case of the high-speed shear agitation. It is generally preferable to carry out the low-speed shear agitation for a period of about 1 to 30 minutes, more preferably about 3 to 20 minutes. When the low-speed shear agitation is carried out at an excessively high temperature, polymerization substantially starts before the particle size distribution of the dispersoid droplets is narrowed, so that it is difficult to obtain a polymer with a narrow particle size distribution desired. This undesirable situation arises also from a shorter agitation time. On the other hand, low-speed shear agitation for an excessively long time is uneconomical on a productivity basis and causes coarsening of the dispersoid droplets, making it difficult to obtain fine polymer particles desired.

Suspension Polymerization

After the low-speed shear agitation as above is finished, polymerization is carried out by raising the temperature inside the polymerization vessel gradually to a temperature of from 40° to 80° C., preferably from 40° to 70° C. while the reaction mixture is being stirred at a low speed. The polymerization duration varies depending on the polymerization degree of the polymer desired, etc., and is generally about 3 to 10 hours. During the polymerization, it is preferable to continue the aforementioned low-speed shear agitation.

According to this invention, it is also preferable to provide a coating of a scale preventive agent on inner walls of the polymerization vessel, prior to charging the polymerization vessel with the finely divided dispersion prepared by the high-speed shear agitation. The coating thus provided inhibits effectively the deposition of polymer scale on the inner walls of the polymerization vessel. The scale preventive agents for such purpose are known per se, and include, for example, the dyes, pigments and polar organic compounds as disclosed in Japanese Patent Publication (KOKOKU) Nos. 45-30343 (1970), 45-30835 (1970) and 48-29871 (1973); the complexes of polar organic compounds and metal complexes of organic dyes as disclosed in Japanese Patent Publication (KOKOKU) No. 51-37308 (1976); the electron-donative organic compounds, electron-acceptive organic compounds or compounds obtained by treating at least one of these organic compounds with an oxidizing agent, reducing agent or basic substance, as disclosed in Japanese Patent Publication (KOKOKU) No. 53-46235 (1978); the coating solutions containing at least one compound selected from the group consisting of alkali metal salts and ammonium salts of a sulfonic acid type or carboxylic acid type water-soluble anionic dye and having an adjusted pH of 7 or below, as disclosed in Japanese Patent Publication (KOKOKU) Nos. 56-5442 (1981), 56-5443 (1981) and 56-5444 (1981); and so on.

In the process according to this invention as above, various design modifications are possible within such ranges as not to defeat the object of this invention, namely, the object of obtaining a polymer having a particulate form with a narrow particle size distribution. For example, part of the polymerization initiator, the dispersant or other additive may be first placed in the polymerization reaction system and the remaining part be placed into the reaction system after the high-speed shear agitation. Especially, the scale-preventive additive and the like may be added to the polymerization system immediately before the start of polymerization.

Polymer

The vinyl chloride polymer obtained in the manner as above has an average particle diameter of from 120 to 170 μm, for example, and at least 98% by weight of the whole polymer is constituted of particles having diameters in the range from 75 to 300 μm. Thus, the vinyl chloride polymer has an extremely narrow distribution of particle size. Furthermore, the vinyl chloride polymer shows few fish-eyes upon being formed into a sheet or the like.

EXAMPLES

Examples 1-3

A 2000-liter stainless steel premixing vessel equipped with a stirrer was charged with 900 kg of deionized water, and with an 8/2 (by weight) mixture of partially saponified polyvinyl alcohol (per cent saponification:80 mol %) and hydroxypropyl methyl cellulose as a dispersant in the amount set forth in Table 1. Then, 322 g of di-2-ethylhexyl peroxydicarbonate as a polymerization initiator was added to the premixing vessel and, after degasification, 700 kg of vinyl chloride monomer was added, followed by agitation at room temperature (20° C.) by the stirrer at a rotation frequency of 330 rpm.

Next, the dispersion thus obtained was passed through a two-stage high-pressure jet type homogenizer (Model M6, a product by Mantan-Gaulin) under a first-stage pressure of 100 kg/cm$^2$ (equivalent to a shear rate of $10^5$ sec$^{-1}$) and a second-stage pressure of 100 kg/cm$^2$ (equivalent to a shear rate of $10^5$ sec$^{-1}$). The thus homogenized dispersion was introduced into a 2000-liter stainless steel polymerization vessel equipped with a stirrer.

Subsequently, the dispersion in the polymerization vessel was stirred by the stirrer at a rotation frequency of 230 rpm (shear rate:45 sec$^{-1}$) for 5 minutes, before the dispersion temperature was raised to 57° C. to effect polymerization. During the polymerization, agitation was continued by rotating the stirrer at a rate of 230 rpm.

When the pressure inside the polymerization vessel decreased to 6.0 kg/cm$^2$G, the polymerization was stopped, and unreacted monomer was recovered. The polymerization product was dehydrated and dried to obtain a vinyl chloride polymer. The polymer thus obtained was subjected to measurement of apparent specific gravity (or bulk density), particle size distribution, plasticizer absorptivity and the number of fish-eyes. The results are shown in Table 1.

Comparative Examples 1-7

In Comparative Examples 1 to 7, polymerization of vinyl chloride was carried out in the same manner as in Examples 1 to 3, except for the following points.

Comparative Example 1: neither the high-speed agitation by the homogenizer nor the low-speed agitation subsequent to the high-speed agitation was carried out.

Comparative Example 2: only the low-speed agitation was carried out, without the high-speed agitation.

Comparative Example 3: only the high-speed agitation by the homogenizer was carried out, without the low-speed agitation.

Comparative Example 4: the amount of the dispersant used in Comparative Example 1 was increased.

Comparative Example 5: polymerization was carried out according to Example 5 of Japanese Patent Publication (KOKOKU) No. 63-56245 (1988).

Comparative Example 6: After carrying out the low-speed agitation (230 rpm) only, polymerization was started while continuing said agitation. When two hours passed after the start of the polymerization, the agitation speed was decreased to 185 rpm (shearing speed; 36 sec$^{-1}$), and the agitation was continued until the end of polymerization.

Comparative Example 7: After carrying out the low-speed agitation (230 rpm) alone, polymerization was started while continuing said agitation. When two hours passed after the start of the polymerization, the agitation speed was increased to 400 rpm (shearing speed; 78 sec$^{-1}$), and the agitation was continued until the end of polymerization.

Fish-eye

A composition was prepared according to the following formulation ("parts" means "parts by weight):
  100 parts of vinyl chloride polymer,
  50 parts of DOP (dioctyl phthalate),
  0.5 parts of tribasic lead sulfate, 1.5 parts of lead stearate,
0.1 parts of titanium oxide, and
0.05 parts of carbon black.

B: partial deposition of scale was observed.
C: deposition of scale was observed on the entire inner wall surfaces of the polymerization vessel.

TABLE 1

|  | Examples | | | Comparative examples | | | | | | |
|---|---|---|---|---|---|---|---|---|---|---|
|  | 1 | 2 | 3 | 1 | 2 | 3 | 4 | 5 | 6 | 7 |
| Amount of dispersant*) (wt. % based on monomer) | 0.033 | 0.05 | 0.06 | 0.033 | 0.033 | 0.033 | 0.10 | Example 5 in Japanese Patent Publication (KOKOKU) No. 63-56245 (1988) | 0.033 | 0.033 |
| High-speed agitation | Done | Done | Done | Not done | Not done | Done | Not done | | Not done | Not done |
| Low-speed agitation | Done | Done | Done | Not done | Done | Not done | Not done | | Done | Done |
| Apparent specific gravity (g/cc) | 0.497 | 0.480 | 0.472 | Stable dispersed particle were not obtained | 0.452 | 0.468 | 0.472 | 0.308 | 0.456 | 0.451 |
| Plasticizer absorptivity (wt. %) | 26.1 | 25.5 | 24.3 | | 23.4 | 25.8 | 22.4 | Not measurable | 23.1 | 23.5 |
| Particle size distribution (%) | | | | | | | | | | |
| 48 mesh | 100 | 100 | 100 | | 95.5 | 98 | 100 | 100 | 90.5 | 96.7 |
| 60 mesh | 100 | 100 | 100 | | 69.2 | 76.5 | 97.6 | 100 | 56.2 | 72.3 |
| 100 mesh | 40.2 | 50.1 | 62.1 | | 32.1 | 40.5 | 69.6 | 100 | 29.3 | 45.2 |
| 200 mesh | 0 | 0.1 | 0.2 | | 0.2 | 4.0 | 2.0 | 100 | 0.1 | 0.9 |
| Number of fish-eyes | 3 | 5 | 8 | | 200 | 5 | 1000 | 100 | 200 | 200 |
| Deposition of scale | A | A | A | | C | A | C | C | C | C |

*)Dispersant: partially saponified polyvinyl alcohol/hydroxypropyl methyl cellulose (8/2)

Twenty-five (25) grams of the composition was kneaded by 6", kneading rolls at 140° C. for 5 minutes, and then formed into a sheet 10 cm wide and 0.2 mm thick. For the sheet thus obtained, the number of transparent particles per 100 cm² was counted, to be used as an index of fish-eye.

Apparent Specific Gravity

Measured according to JIS K-67.

Particle Size Distribution

Measured according to JIS Z-8801.

Plasticizer Absorptivity

After an admixture of 10 g of each vinyl chloride polymer with 20 g of DOP was left to stand for 1 hour, the DOP left unabsorbed was removed by a centrifugal separator, and the weight of the polymer with the absorbed DOP was measured. The amount (wt. %) of the DOP absorbed by the polymer was calculated from the measurement.

Scale Deposition

The inner wall surfaces of the polymerization vessel were visually checked for deposition of scale, and the extent of scale deposition was indicated according to the following criteria.

A: little deposition of scale was observed.

Examples 4-9

In each of these examples, a vinyl chloride polymer was obtained in the same manner as in Example 1 except that a 9/1 (by weight) mixture of a partially saponified polyvinyl alcohol (per cent saponification:80 mol %) and hydroxypropyl methyl cellulose was used as the dispersant, in an amount of 0.04% by weight based on the vinyl chloride, and that the conditions of high-speed agitation by the homogenizer and the conditions of low-speed agitation after the homogenizer treatment were changed as set forth in Table 2. The properties of the polymers thus obtained are shown in Table 2.

TABLE 2

|  | Examples | | | | | |
|---|---|---|---|---|---|---|
|  | 4 | 5 | 6 | 7 | 8 | 9 |
| High-speed agitation shear rate (sec⁻¹) | | | | | | |
| First stage | $1 \times 10^5$ | $1 \times 10^5$ | $4 \times 10^5$ | $8 \times 10^5$ | $10 \times 10^5$ | $8 \times 10^5$ |
| Second stage | 0 | 0 | 0 | 0 | 0 | $1 \times 10^5$ |
| Low-speed agitation shear rate (sec⁻¹) | 45 (× 3 min) | 45 (× 20 min) | 40 (× 10 min) | 40 (× 10 min) | 40 (× 10 min) | 40 (× 10 min) |
| Apparent specific gravity (g/cc) | 0.489 | 0.485 | 0.485 | 0.482 | 0.481 | 0.483 |
| Plasticizer absorptivity (wt. %) | 25.0 | 25.3 | 25.1 | 25.3 | 25.5 | 24.9 |
| Particle size distribution (%) | | | | | | |
| 48 mesh | 100 | 100 | 100 | 100 | 100 | 100 |
| 60 mesh | 100 | 100 | 100 | 100 | 100 | 100 |
| 100 mesh | 38.5 | 39.0 | 40.5 | 41.8 | 49.6 | 50.1 |
| 200 mesh | 0 | 0 | 0 | 0 | 0.1 | 0.1 |
| Number of fish-eyes | 4 | 5 | 4 | 2 | 1 | 2 |
| Deposition of scale | A | A | A | A | A | A |

Examples 10-15

Each of the scale preventive agent-containing coating solutions I to VI set forth below was applied to inner wall surfaces of a polymerization vessel and dried by heating at 50° C. for 10 minutes, to form a coating. Thereafter, polymerization was carried out in the same manner as in Example 2.

After the polymerization was over, the polymerizate was taken out, and the interior of the polymerization vessel was washed with water. Subsequently, the polymerization run comprising the steps of forming a coating of scale preventive agent, feed of the polymerization materials, polymerization, and washing the polymerization vessel with water was repeated, to determine the number of polymerization runs (number of scale prevented runs) which were possible before the deposition of scale on the inner surfaces of the polymerization vessel exceeded 1 g/m². The results are shown in Table 3.

Coating solution I: a solution containing C.I. Acid Orange 3, C.I. Basic orange 14 and phytic acid, as used in Experiment No. 40 in Japanese Patent Publication (KOKOKU) No. 56-5443 (1981).

Coating solution II: a coating solution prepared by treating a 1% methanol solution of a 100/100 (molar ratio) mixture of diphenylene oxide and Oil Red SA with chloranil at 90° C. for 30 minutes, as described in Experiment No. 42 in Japanese Patent Publication (KOKOKU) No. 53-46235 (1978).

Coating solution III: a benzene solution of p-benzoquinone, as used in Experiment No. 17 of Example 1 in Japanese Patent Publication (KOKOKU) No. 45-30343 (1970).

Coating solution IV: a coating solution prepared by treating an ethanol solution of diaminonaphthalene and nigrosine with thiophenol at 90° C. for 30 minutes, as used in Experiment No. 31 in Japanese Patent Publication (KOKOKU) No. 53-46235 (1978).

Coating solution V: a coating solution prepared by dissolving a nigrosine base-$AgNO_3$ complex in a 50/50 (by weight) methylene chloride/methanol mixture, as described in Experiment No. 19 of Example 1 in Japanese Patent Publication (KOKOKU) No. 51-37308 (1976).

Coating solution VI: an aqueous solution (pH 6.0) of C.I. Acid Black 2 and iron(I) chloride, as described in Experiment No. 79 of Example 1 in Japanese Patent Publication 56-5442 (1981).

TABLE 3

| Example | scale preventive agent | Number of scale prevented runs |
| --- | --- | --- |
| 10 | Coating solution I | 60 |
| 11 | Coating solution II | 40 |
| 12 | Coating solution III | 50 |
| 13 | Coating solution IV | 55 |
| 14 | Coating solution V | 40 |
| 15 | Coating solution VI | 45 |

Examples 16–20

Polymerization was carried out in the same manner as in Example 2 except that one of the scale-preventive additives as set forth below was added to the reaction mixture immediately before the polymerization was started after the low-speed agitation was over.

After the polymerization was over, the polymerizate was taken out, and the interior of the polymerization vessel washed with water. Thereafter, the polymerization run from the feed of materials through polymerization to the washing of the polymerization vessel with water was repeated, to determine the number of polymerization runs (number of scale prevented runs) which were possible before the deposition of scale on the inner surfaces of the polymerization vessel exceeded 1 g/m². The results are shown in Table 4.

Additive (1): sodium ethylxanthogenate as used in Experiment No. 7 of Example 1 in Japanese Patent Publication (KOKOKU) No. 60-38407 (1985) was added in an amount of 5 ppm based on the vinyl chloride polymer.

Additive (2): potassium nitrate as used in Example 2 in Japanese Patent Publication (KOKOKU) No. 51-1471 (1976) was added in an amount of 0.1 ppm based on the vinyl chloride polymer.

Additive (3): hydrazine hydrate as used in Example 10 in Japanese Preexamination Patent Publication (KOKAI) No. 50-111187 (1975) was added in an amount of 150 ppm based on the vinyl chloride polymer.

Additive (4): ammonium thiocyanate was added in an amount of 10 ppm based on the vinyl chloride polymer.

In Example 19, the aforementioned scale-preventive additive was added to the polymerization system and inner walls of the polymerization vessel were coated with the above coating solution I (scale preventive agent), before each polymerization run.

In Example 20, similarly, the aforementioned scale-preventive additive was added to the polymerization system and inner walls of the polymerization vessel were coated with the following coating solution VII (scale preventive agent), before each polymerization run.

Coating solution VII: a coating solution containing C.I. Acid Blue 116 and acetic acid, as used in Experiment No. 33 of Example 2 in Japanese Preexamination Patent Publication (KOKAI) No. 60-6361 (1985).

TABLE 4

| Example | Scale-preventive coating solution | Scale-preventive additive | Number of scale prevented runs |
| --- | --- | --- | --- |
| 16 | nil | Additive (1) | 20 |
| 17 | nil | Additive (2) | 10 |
| 18 | nil | Additive (3) | 10 |
| 19 | Coating soln. I | Additive (4) | 100 |
| 20 | Coating soln. VII | Additive (5) | 80 |

We claim:

1. A process for preparation of a vinyl chloride polymer comprising the steps of subjecting an aqueous medium containing vinyl chloride monomer or a mixture of vinyl chloride monomer with other vinyl monomer, a polymerization initiator and a dispersant to high-speed shear agitation at a shear rate of from $10^4$ sec$^{-1}$ to $10^6$ sec$^{-1}$ at 10° to 30° C. for 0.05 to 5 seconds to prepare a suspended dispersion containing fine particles of the monomer(s) dispersed therein, then subjecting the suspended dispersion to low-speed agitation at a shear rate of from 10 to 100 sec$^{-1}$ at 10° to 30° C. for 1 to 30 minutes, and thereafter starting suspension polymerization.

2. The process according to claim 1, wherein a scale-preventive additive is added to the reaction mixture before the start of the polymerization.

3. The process according to claim 1, wherein the suspension polymerization is carried out in a polymerization vessel preliminarily provided with a coating of a scale preventive agent on an inner wall thereof.

4. The process according to claim 1, wherein the monomer to be polymerized is a mixture of at least 50% by weight of vinyl chloride with less than 50% by weight of at least one monomer selected from the group consisting of vinyl acetate, vinyl propionate, methyl acrylate, ethyl acrylate, methyl methacrylate, ethyl methacrylate, ethylene, propylene, maleic anhydride, acrylonitrile, styrene and vinylidene chloride.

5. The process according to claim 1, wherein the high-speed shear agitation is carried out at a shear rate of from $10^5$ to $10^6$ sec$^{-1}$ and the low-speed shear agitation is carried out at a sheer rate of from 40 to 45 sec$^{-1}$.

* * * * *